US008378781B1

(12) United States Patent
Peterson

(10) Patent No.: US 8,378,781 B1
(45) Date of Patent: Feb. 19, 2013

(54) ANIMATED LIGHT STRING SYSTEM

(75) Inventor: John W. Peterson, Menlo Park, CA (US)

(73) Assignee: John W. Peterson, Menlo Park, CA (US)

( * ) Notice: Subject to any disclaimer, the term of this patent is extended or adjusted under 35 U.S.C. 154(b) by 334 days.

(21) Appl. No.: 12/762,306

(22) Filed: Apr. 17, 2010

Related U.S. Application Data

(60) Provisional application No. 61/214,029, filed on Apr. 17, 2009.

(51) Int. Cl.
*G05B 23/02* (2006.01)

(52) U.S. Cl. ........................................................ 340/3.5

(58) Field of Classification Search .................. 340/3.5, 340/2.2; 315/312; 362/296, 346
See application file for complete search history.

(56) References Cited

U.S. PATENT DOCUMENTS

| | | | | |
|---|---|---|---|---|
| 6,344,716 | B1 | 2/2002 | Gibboney, Jr. | |
| 6,608,453 | B2 | 8/2003 | Morgan et al. | |
| 6,653,797 | B2 | 11/2003 | Puleo, Sr. et al. | |
| 6,933,680 | B2 | 8/2005 | Oskorep et al. | |
| 6,967,448 | B2 | 11/2005 | Morgan et al. | |
| 7,161,313 | B2 | 1/2007 | Piepgras et al. | |
| 7,257,551 | B2 | 8/2007 | Oskorep et al. | |
| 7,258,463 | B2 | 8/2007 | Sloan et al. | |
| 7,471,048 | B2 | 12/2008 | Peng | |
| 7,550,935 | B2 | 6/2009 | Lys et al. | |
| 7,576,497 | B2 | 8/2009 | Peng | |
| 7,614,767 | B2 | 11/2009 | Zulim et al. | |
| 2005/0116667 | A1 * | 6/2005 | Mueller et al. | 315/312 |
| 2005/0269580 | A1 | 12/2005 | D'Angelo | |

* cited by examiner

*Primary Examiner* — Vernal Brown

(57) ABSTRACT

A system for controlling a string of lights, where each light or group of lights has a microcontroller for controlling their brightness and color. The light's microcontrollers are connected with serial data communication lines in a daisy chain fashion. Unique identification numbers are automatically assigned sequentially to each of the lights so brightness or color information transmitted on the serial data line is directed to a particular light. A plurality of brightness and color settings are stored on each light, and the string of lights synchronously switches between them on command from the serial line, or smoothly fades between them on command from the serial line.

6 Claims, 10 Drawing Sheets

Fig 5A
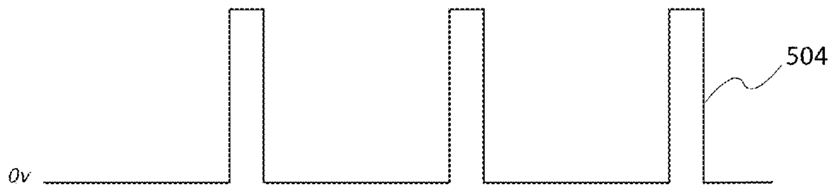
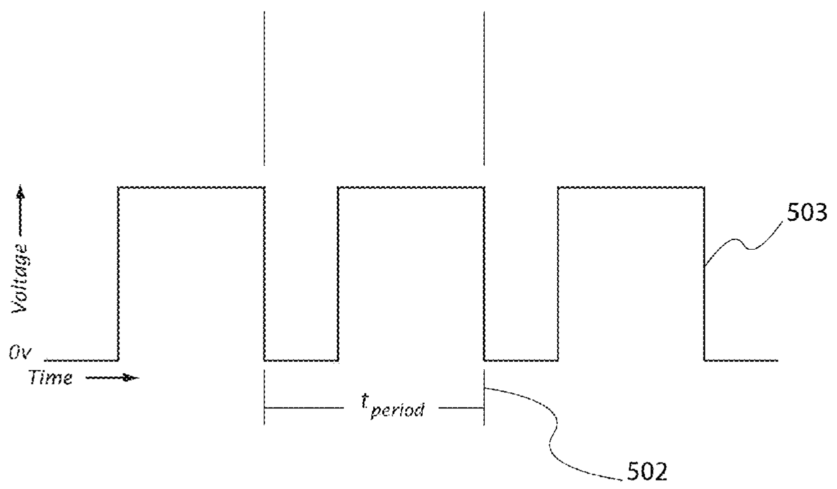
Fig 5B

Fig 6

| Index | 0 | 1 | 2 | 3 | 4 | 5 | 6 | 7 |
|---|---|---|---|---|---|---|---|---|
| Red | 0 | 1 | 3 | 7 | 20 | 50 | 135 | 360 |
| Green | 0 | 1 | 3 | 7 | 20 | 55 | 150 | 410 |
| Blue | 0 | 1 | 3 | 7 | 18 | 46 | 120 | 310 |

600 602 604 606

704

| Transition | u0 | u1 | u2 | u3 | u4 | u5 | u6 | u7 |
|---|---|---|---|---|---|---|---|---|
| 0 -> 1 | 4 \| 0 | 4 \| 0 | 5 \| 0 | 5 \| 0 | 6 \| 0 | 6 \| 0 | 7 \| 0 | 0 \| 1 |
| 0 -> 2 | 4 \| 0 | 5 \| 0 | 6 \| 0 | 0 \| 1 | 0 \| 1 | 1 \| 1 | 0 \| 1 | 1 \| 1 |
| 0 -> 3 | 4 \| 0 | 6 \| 0 | 0 \| 1 | 1 \| 1 | 0 \| 1 | 1 \| 1 | 2 \| 1 | 2 \| 1 |
| 0 -> 4 | 4 \| 0 | 0 \| 1 | 1 \| 1 | 1 \| 1 | 1 \| 1 | 3 \| 1 | 5 \| 1 | 7 \| 1 |
| 0 -> 5 | 5 \| 0 | 0 \| 1 | 1 \| 1 | 2 \| 1 | 4 \| 1 | 7 \| 1 | 6 \| 2 | 6 \| 4 |
| 0 -> 6 | 5 \| 0 | 1 \| 1 | 1 \| 1 | 4 \| 1 | 4 \| 2 | 4 \| 4 | 2 \| 17 | 7 \| 10 |
| 0 -> 7 | 6 \| 0 | 1 \| 1 | 3 \| 1 | 7 \| 1 | 5 \| 3 | 2 \| 19 | 4 \| 23 | 7 \| 29 |
| 1 -> 2 | 0 \| 1 | 0 \| 1 | 0 \| 1 | 1 \| 1 | 0 \| 1 | 0 \| 1 | 0 \| 1 | 1 \| 1 |
| 1 -> 3 | 0 \| 1 | 1 \| 1 | 0 \| 1 | 1 \| 1 | 0 \| 1 | 1 \| 1 | 2 \| 1 | 1 \| 1 |
| 1 -> 4 | 0 \| 1 | 1 \| 1 | 1 \| 1 | 1 \| 1 | 2 \| 1 | 3 \| 1 | 4 \| 1 | 6 \| 1 |
| 1 -> 5 | 1 \| 1 | 1 \| 1 | 1 \| 1 | 3 \| 1 | 5 \| 1 | 7 \| 1 | 6 \| 2 | 5 \| 4 |
| 1 -> 6 | 1 \| 1 | 1 \| 1 | 3 \| 1 | 6 \| 1 | 4 \| 2 | 5 \| 4 | 7 \| 5 | 6 \| 10 |
| 1 -> 7 | 1 \| 1 | 2 \| 1 | 5 \| 1 | 5 \| 2 | 7 \| 3 | 7 \| 6 | 4 \| 23 | 6 \| 31 |
| 2 -> 3 | 0 \| 1 | 0 \| 1 | 1 \| 1 | 0 \| 1 | 1 \| 1 | 1 \| 1 | 0 \| 1 | 1 \| 1 |
| 2 -> 4 | 0 \| 1 | 1 \| 1 | 2 \| 1 | 1 \| 1 | 2 \| 1 | 3 \| 1 | 3 \| 1 | 4 \| 1 |
| 2 -> 5 | 1 \| 1 | 2 \| 1 | 2 \| 1 | 4 \| 1 | 5 \| 1 | 6 \| 1 | 6 \| 2 | 4 \| 4 |
| 2 -> 6 | 1 \| 1 | 3 \| 1 | 5 \| 1 | 7 \| 1 | 6 \| 2 | 5 \| 4 | 4 \| 8 | 4 \| 13 |
| 2 -> 7 | 2 \| 1 | 4 \| 1 | 4 \| 2 | 7 \| 2 | 2 \| 13 | 7 \| 7 | 4 \| 23 | 6 \| 27 |
| 3 -> 4 | 1 \| 1 | 1 \| 1 | 1 \| 1 | 2 \| 1 | 1 \| 1 | 2 \| 1 | 2 \| 1 | 2 \| 1 |
| 3 -> 5 | 2 \| 1 | 3 \| 1 | 3 \| 1 | 4 \| 1 | 5 \| 1 | 7 \| 1 | 3 \| 3 | 1 \| 11 |
| 3 -> 6 | 3 \| 1 | 5 \| 1 | 6 \| 1 | 5 \| 2 | 7 \| 2 | 5 \| 4 | 7 \| 4 | 7 \| 6 |
| 3 -> 7 | 5 \| 1 | 7 \| 1 | 6 \| 2 | 5 \| 4 | 4 \| 8 | 4 \| 13 | 5 \| 17 | 7 \| 20 |
| 4 -> 5 | 2 \| 1 | 3 \| 1 | 3 \| 1 | 4 \| 1 | 4 \| 1 | 5 \| 1 | 5 \| 1 | 6 \| 1 |
| 4 -> 6 | 5 \| 1 | 7 \| 1 | 2 \| 5 | 2 \| 5 | 7 \| 2 | 6 \| 3 | 6 \| 4 | 7 \| 4 |
| 4 -> 7 | 4 \| 2 | 1 \| 13 | 4 \| 4 | 7 \| 4 | 6 \| 6 | 4 \| 13 | 6 \| 13 | 5 \| 22 |
| 5 -> 6 | 6 \| 1 | 4 \| 2 | 4 \| 2 | 5 \| 2 | 5 \| 2 | 1 \| 13 | 1 \| 13 | 4 \| 4 |
| 5 -> 7 | 7 \| 2 | 6 \| 3 | 1 \| 23 | 7 \| 4 | 2 \| 19 | 6 \| 8 | 2 \| 31 | 6 \| 13 |
| 6 -> 7 | 6 \| 3 | 1 \| 19 | 1 \| 23 | 5 \| 5 | 1 \| 29 | 3 \| 11 | 6 \| 6 | 7 \| 6 |

Fig 8

706 708 710

| s0 | s1 | s2 | s3 | s4 | s5 | s6 | s7 |
|---|---|---|---|---|---|---|---|
| 5 \| 1 | 7 \| 1 | 2 \| 5 | 2 \| 5 | 7 \| 2 | 6 \| 3 | 6 \| 4 | 7 \| 4 |
| 20 + 1 | 25 + 1 | 32 + 5 | 42 + 5 | 52 + 2 | 66 + 3 | 84 + 4 | 108 + 4 |
| 21 + 1 | 26 + 1 | 37 | 47 | 54 + 2 | 69 + 3 | 88 + 4 | 112 + 4 |
| 22 + 1 | 27 + 1 | 37 | 47 | 56 + 2 | 72 + 3 | 92 + 4 | 116 + 4 |
| 23 + 1 | 28 + 1 | 37 + 5 | 47 + 5 | 58 + 2 | 75 + 3 | 96 + 4 | 120 + 4 |
| 24 + 1 | 29 + 1 | 42 | 52 | 60 + 2 | 78 + 3 | 100 + 4 | 124 + 4 |
| 24 | 30 + 1 | 42 | 52 | 62 + 2 | 81 + 3 | 104 + 4 | 128 + 4 |
| 24 + 1 | 31 + 1 | 42 | 52 | 64 + 2 | 84 | 108 | 132 + 4 |
| 25 | 32 | 42 | 52 | 66 | 84 | 108 | 136 |

Fig 9

| Name | Specification | Description |
|---|---|---|
| Init | I<ID> | Sets the IDs of this and subsequent lights<br>Sets LED to color corresponding to ID |
| Init | i<ID> | As above, but doesn't change light color |
| Color | C<ID><color> | Sets LED at <ID> to <color> (cur frame)<br>Note high bit of <ID> is MSB of red color |
| Dest | D<frame #> | Sets dest slot for frame color (all lights) |
| Frame | F<frame #> | Sets displayed frame (all lights, not synchronous) |
| FadeTo | f<frame #> | Fade to displaying frame (all lights, not synchronus) |
| Step | S | Steps one forward in the animation (synchronous) |
| Step | s | Fades one forward in the animation (synchronous) |
| Time | T<ticks> | Sets the duration of each animation step |
| Run | R | Starts the animation at frame 0 |
| Halt | H | Stops the animation |
| Number | N<count> | Broadcasts the light count |

ANIMATED LIGHT STRING SYSTEM

CROSS-REFERENCE TO RELATED APPLICATIONS

This application claims the benefit of the U.S. Provisional Patent Application having Application No. 61/214,029 and filed on Apr. 17, 2009, the disclosure of which is incorporated by reference herein.

PROGRAM LISTINGS

Computer Program Listing 1 (LEDctlr.c) is a C program suitable for execution on a microcontroller for implementing the invention.

Computer Program Listing 2 (ControllerDemonstration.py) is a Python program to run on an external computer to display patterns on the lights.

BACKGROUND

1. Field of the Invention

This invention relates to strings of lights used for the purpose of decoration, signage, or architectural accents, with lights that change color and brightness.

2. Prior Art

The following is a tabulation of some prior art that presently appears relevant:

| Patent/Pub. # | Kind Code | Issue Date | Inventor |
|---|---|---|---|
| 2005/0269580 | A1 | 2005 | D'Angelo |
| 6,608,453 | B2 | 2003 | Morgan, et al. |
| 7,257,551 | B2 | 2007 | Oskorep et al. |
| 7,550,935 | B2 | 2009 | Lys et al. |
| 7,471,048 | B2 | 2008 | Peng |
| 7,576,497 | B2 | 2009 | Peng |
| 7,161,313 | B2 | 2007 | Piepgras et al. |

Using LEDs (light emitting diodes) for lighting displays, such as holiday lighting, decorative displays, signage, or architectural accents, has become common. By combining primary colored LED lights of red, green and blue, most any common color is easily generated by these lights. Individually controlling the power to each light, as done in U.S. Pat. No. 7,257,551 Oskorep et al. (2007) requires a substantial amount of wiring, which becomes cumbersome with significant numbers of lights. U.S. Pat. Nos. 7,471,048 (2008) and 7,576,497 (2009) due to Peng, provide a method of synchronizing the lights, but no straightforward way to individually program them, thus limiting the types of displays available.

Other systems such as U.S. Pat. No. 7,550,935 (2009) by Lys et al. require specialized or custom controllers be present to maintain the pattern or animation. The system here uses standard, inexpensive microcontrollers to maintain the display.

SUMMARY OF THE INVENTION

The system introduced here reduces the overall system complexity by adding inexpensive microcontrollers to each light in the string. The protocol operates in a daisy chain fashion between the controllers, and requires only one additional wire between the lights in the string.

Color changes are stored locally on the lights, allowing animated patterns to be displayed by sending a single synchronization command. In addition, fading from one color to the next on each light is accomplished locally on the light. Thus the lights are capable of a wide variety of patterns and displays, and yet may be implemented with very small, inexpensive microcontrollers.

Advantages

This system has several advantages over existing lighting systems:

- Only three wires are required between lights in the string (power, ground, and one data wire).
- The system is implemented with very low cost microcontrollers and a minimum number of electronic parts and cables.
- Each light is individually programmable with a set of colors. All lights can synchronously step from one prestored color to the next, allowing simple control of all lights.
- Each light independently stores a sequence of different colors, allowing the system to easily animate a multitude of colors.
- Lights can fade from one color to the next. The intermediate fading levels are computed autonomously by each light.
- The simple protocol is easy to transmit to the lights. Once an animation is loaded into the lights, they can be set up in a “free running” fashion.
- The daisy chain structure is robust with the number of lights, since each light in the chain generates a fresh copy of the signal.
- The lights are controlled with a simple, standard serial protocol available on a wide range of devices and computers.

DRAWINGS

Figures

In the drawings, closely related figures have the same number but different alphabetic suffixes.

FIGS. 5A and 5B show graphs of the pulse-width modulation (PWM) scheme used to control the brightness of the LEDs FIG. 6 shows the table used for storing the values for the PWM duty-cycle values for various brightness levels of the LEDs

FIG. 8 shows a table of PWM duty-cycle values generated during the fade operation.

FIG. 9 is a table showing the protocol commands used to control the lights.

DETAILED DESCRIPTION

Figure 1:
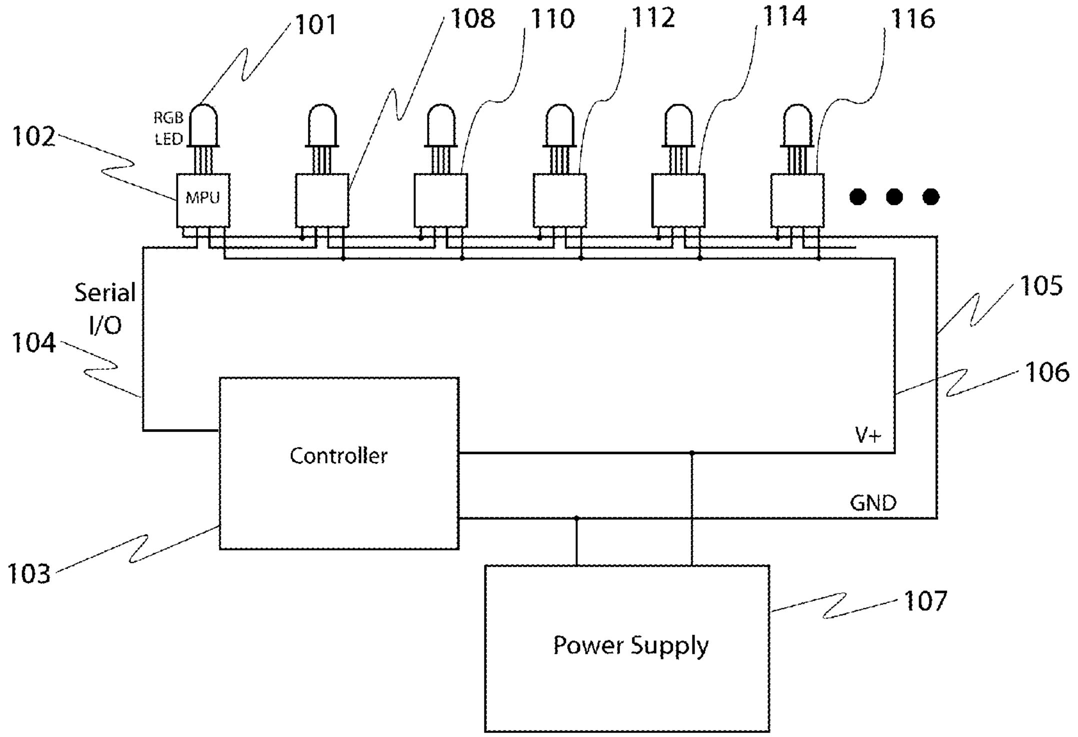
FIG. 1 shows an overview of the typical system, with a power supply, optional controller, and string of lights.
Figure 2:
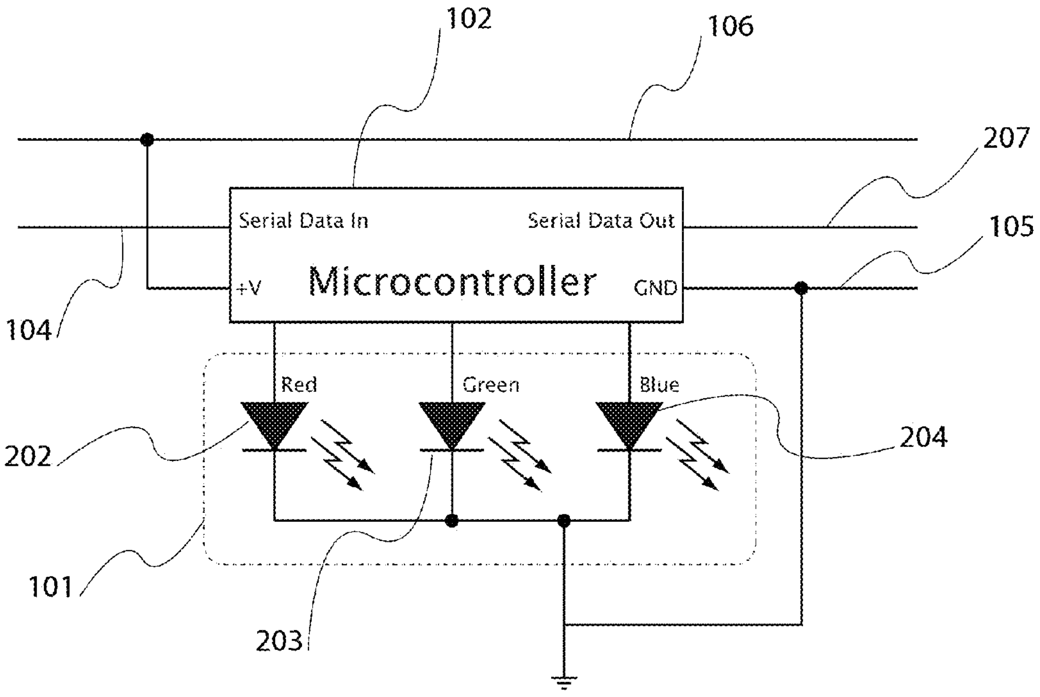
FIG. 2 shows a detailed view of one light in the string.
Figure 3:
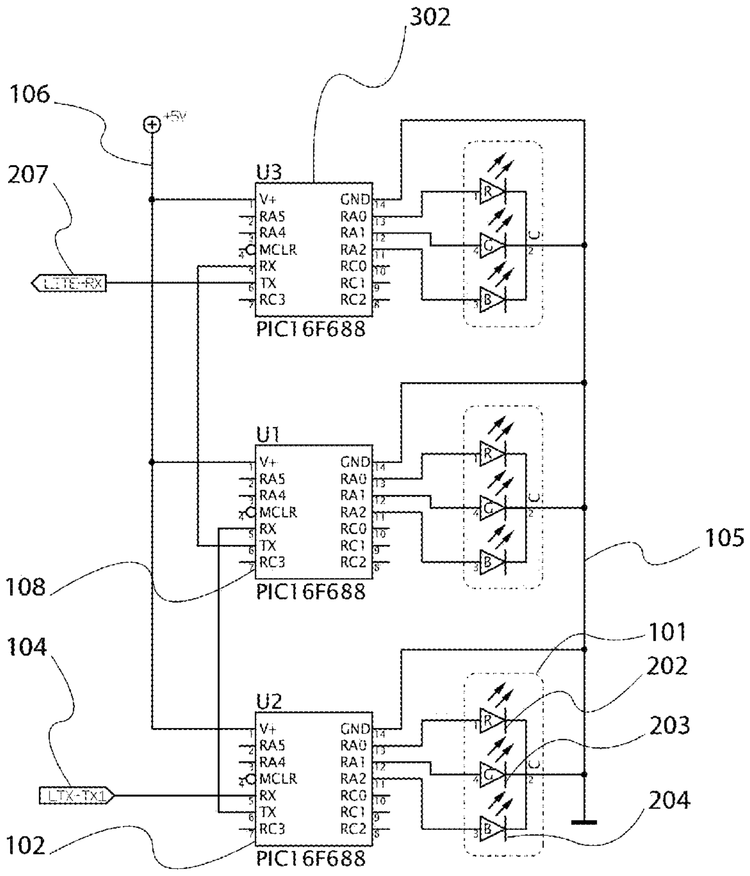
FIG. 3 shows a schematic diagram of the first embodiment of the invention.

A schematic drawing of a first embodiment of the invention is shown in FIG. 1. Each RGB Light Emitting Diode 101 has three component LEDs, red green and blue. These LEDs share a common cathode and have separate inputs for powering the red, green and blue component LED anodes. A microcontroller 102 is connected to each RGB LED anode. By controlling the duty cycle using pulse-width modulation (PWM), the brightness of each component LED is controlled, thus controlling the overall brightness and color.

In addition to controlling the LED, each microcontroller also listens to a serial control line 104. The serial control lines of each of the lights are connected in a "daisy chain" fashion, where the output of a light's microcontroller is connected to the input of a subsequent light's microcontroller. An external controller 103, such as another microcontroller, personal computer, or network serial interface is connected to the serial input of the first microcontroller in the string. The external controller supplies commands to the string of lights. This transmits instructions and data to the first light's microcontroller using a serial protocol such as RS-232 or I2C to the first light in the string 102.

After receiving the commands, the first light's microcontroller broadcasts the command to the next light's microcontroller 108. Each subsequent microcontroller listens to the input and rebroadcasts as needed to an output line to the next microcontroller in the chain 110 according to a protocol discussed below.

When the lights are initialized, each light is assigned a unique sequential identification number (ID). Subsequent commands from the controller can send commands to a specific light in the string, instructing it to change color, or store a series of colors on a particular light for use in animations. In some embodiments of the invention, colors and animations may be stored on the microcontroller's electronically erasable programmable read only memory (EEPROM), allowing the lights to maintain their colors and/or animations without the controller 103 present.

To animate the lights, it is important that all of the lights switch at the same time. To accomplish this with the daisy chain structure, a special timing scheme, described below, synchronizes the lights so the first light and each subsequent light in the string delays changing until the last light in the string receives the command to change.

In the first embodiment of the invention shown in FIG. 1, each light in a string of lights is constructed from a microcontroller 102, such as the Microchip Technology 16F688, and a red, green, blue (RGB) LED 101 such as the Hebei 540R2 GBG-CC. The RGB LED combines the three colored LEDs into a single package. Each LED has a separate anode connection, and all three share a common cathode connection. Other embodiments may use a wide variety of similar components; the requirements for the microcontroller are: a) it must be able to transmit and receive binary serial data and b) it must be able to independently control the red, green and blue LEDs. A microcontroller with only eight pins is sufficient (two for power, two for serial input/output and three for controlling the LEDs. Such microcontrollers are available from a wide variety of manufacturers. Similarly, a wide variety of RGB LEDs will work.

To control the brightness of each component color LED, the first embodiment uses pulse-width modulation (PWM). Pulse-width modulation varies the amount of light by turning the LED on and off at a rate much faster than the eye can detect, for example 1,000 times per second. FIGS. 5A and 5B show a typical output waveform for an LED controlled with PWM. The time period $t_{period}$ 502 is typically one millisecond in the first embodiment. In FIG. 5A, the LED is only turned on for a small portion of that time period 504, resulting in a dim display. In FIG. 5B, the light is turned on for a much larger period of time 503, resulting in a brighter display.

The amount of electric current applied to a typical LED must typically be limited to about 20 or 30 milliamps to prevent the LED from being overdriven and damaged from excess heat build-up. One way of accomplishing this is to place a current limiting resister between the microcontroller (the current source) and the LED to limit the current flowing through the LED.

However, the same effect can be accomplished by using the PWM duty cycle to limit the overall amount of time the LED is on even at maximum brightness, thus preventing overheating. For example, if a typical PWM cycle $t_{period}$ is 512 clock ticks long, a typical LED may reach full brightness with being "on" for 360 of those cycles, a duty cycle of 70%. The use of PWM for even the brightest value eliminates the need for current-limiting resistors, saving a considerable number of parts in the design.

By varying the brightness of the red, green, and blue LEDs a variety of different colors are generated. In the first embodiment, each LED may be set to eight different brightness levels, ranging from 0 (off) to 7 (full brightness), allowing each light to display 8×8×8=512 different color and brightness combinations. Other embodiments may allow more (or fewer) different brightness levels for each LED.

The maximum brightness is determined by the PWM duty cycle allowing the maximum brightness allowed by the LED specifications. The eight brightness values specified by the protocol are used as indices into a table of PWM duty cycle values. The PWM values in the table specify the amount of "on" time for a given PWM cycle of length $t_{period}$ 502. For example, if the PWM cycle is 512 clock ticks long, a table entry of 256 specifies the light is on for 50% of the cycle (bright), and a table entry of 51 specifies the light is on for 10% of the cycle (dim).

The PWM table used in the first embodiment is shown in FIG. 6. The top row 600 indicates the eight brightness levels. Since the red, green and blue LEDs have different responses, different PWM values are used so that when they are set to the maximum index value, their brightness is similar and the result is perceived as white. The values must be adjusted for each combination of a given type of microprocessor and RGB LED. The values shown in FIG. 6 are those used in the first embodiment, with an overall PWM cycle of 512 iterations. Thus, maximum brightness for red is achieved with a duty cycle of 360/512, for green is achieved with a duty cycle of 410/512, and for blue with 310/512.

To produce a uniform set of brightness levels from full brightness to "off", each subsequent brightness level needs a duty cycle that is twice as much as the previous one. Thus the entries in each row of the table are found with the formula:

$$2^{\frac{b-1}{6}}(\log_2 P)$$

Where P is the maximum PWM value for the "7" brightness value (360 in the example above), and b is the brightness level ranging from 0 to 7. Thus b is used as an index into the table of PWM values. The PWM value for b=0 is zero. This produces an even distribution of apparent brightness values.

Color values are expressed as a nine-bit value, with three bits for red (allowing seven brightness levels and "off"), three for green, and three for blue. Since the serial protocol used to transmit values only holds eight bits, the ninth bit is encoded as part of the controller ID (see protocol description below).

It is possible to "fade" from one value to the next by incrementing or decrementing the PWM value after a one or more PWM cycles have occurred. This causes a pleasing gradual change of color or brightness.

Figures 7A, 7B:
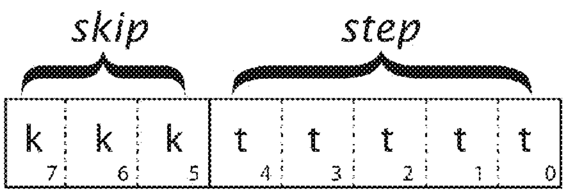
FIGS. 7A and 7B show the layout of the table of values used to fade from one brightness level to another.

To fade from one brightness level to another, the PWM duty cycles must change exponentially during the fade period as defined by the formula above. Since computing this during the PWM cycle is beyond the computational abilities of the small microcontrollers typically used for the lights, a special table shown in FIG. 7A is used as described below.

To facilitate the fade process, the time period the fade transition occurs over is broken into eight sections, each consisting of eight units (64 units total). Each unit consists of a full PWM cycle (consisting of 512 iterations in the first embodiment).

For each section, the rate of change of the PWM values is controlled by two variables, referred to as skip and step. For every skip of the unit's PWM cycles, the PWM values are incremented by step.

As an example in the first embodiment, consider the case of the red LED transitioning from a brightness level of 4 (which has a PWM duty cycle of 20/512) to 6 (which has a duty cycle of 135/512). The table in FIG. 7A, in particular line 702, is used to describe this transition. Each entry in the table 704 contains the skip and step values (written as "skip|step"). So for the first section 706, on every five of eight PWM cycles in the unit, one is added to the PWM value. In the next section 708, unit one is added to the PWM value in seven of the eight PWM cycles in the unit. Then every two units five is added (710), and so on. The progression of the PWM values from a brightness level of four (20/512) to a brightness level of six (136/512) is shown in FIG. 8. FIG. 8 shows the eight sections (across), each with eight units of PWM cycles (down).

Note for transitions between low brightness values where the PWM duty cycle is very small, incrementing the PWM duty cycle is not desirable, because the brightness will increase too quickly. In this case, the skip value of the table is set to zero, and the step value is used as the actual PWM duty cycle value for that particular section. If the skip value is non-zero and the step value is zero, then the PWM duty cycle remains unchanged for that unit of transition. To fade from a brighter value to a dimmer one, the values in the table 704 are simply applied in reverse order.

This process increases the PWM values in a generally smooth exponential fashion, providing a perceptually smooth increase in brightness. However, the only operations required by the microcontroller to perform this transition are sequential table lookups and additions. This places minimal computational requirements on the microcontroller and allows the use of inexpensive parts for the preferred embodiment.

Since there are eight units, the skip value can be expressed in 3 bits, leaving five bits left in a byte to describe the step value (increment in the PWM value) as shown in FIG. 7B. For a PWM cycle of 512 or less, this is a sufficient number of bits to represent the steps. Thus the table is easily very compactly encoded with one byte per entry, making it suitable to implement on very small microcontrollers with limited amounts of storage space. For example, to provide for transitions between all values of eight different levels, a table 704 of only 224 bytes is required. A separate table is required for each LED (red, green and blue) as the maximum PWM duty cycle for each is usually different. The tables are pre-computed using the same exponential function used to compute the PWM duty cycle values. These are broken into eight segments for pair of possible brightness levels a fade may occur between.

The main controller 103 communicates with the lights, and the lights communicate with each other, using a serial protocol. In the first embodiment, this is accomplished with the standard RS-232 protocol on the signal lines coming into 104 and out of 207 each light. The RS-232 protocol defines timing and signaling for transmitting eight bit bytes at pre-described bit rates, such as 9,600 bits per second. The voltage levels used for this signaling are those generated and received by the microcontroller 102 with no external interface components.

Other embodiments may use alternate serial protocols, although in the preferred embodiment a serial protocol not requiring an external clock line is preferable. Some microcontrollers have built-in hardware for processing serial data, such as a UART (universal asynchronous receiver/transmitter). Other embodiments may require the interpretation of the serial data to be performed in software.

In order to control the string of lights, a simple protocol is defined, shown in FIG. 9. In the first embodiment of this protocol, the first byte is a command, followed by up to three parameters. Each of the parameters within angle brackets is a single byte; <color> is lower eight bits of the color specification described above, <ID> is the number (starting from zero) of the light.

Because the specification of color requires nine bits (three each for red, green and blue, respectively), the first eight bits are transmitted in the <color> byte. The remaining bit is transmitted as the $7^{th}$ (high order) bit of the ID. Thus the total number of lights allowed in a string in the first embodiment is 127. Using the upper bit of the ID to transmit the color information helps minimize the amount of transmission time required to send color information to a particular light in the string.

The Init command is given as I<0> to the first light 102. This sets the ID of the first light to zero. This light then increments the ID to one, and sends that to the next light 108, giving that one an ID of one. The light after that 110 receives an ID of 2. Thus all the lights are all given unique IDs. For example the sixth light 116 in the chain shown in FIG. 1 would have an ID of five. When a command with an <ID> parameter is sent, each light compares the <ID> in the command with the ID assigned by the Init command. If a command doesn't apply to this particular LED, the MCU rebroadcasts the command on the serial output port, where it's fed to the receiver of the next light's MCU. Some commands, such as Time, Run and Halt, are only run on the light with ID zero.

Multiple color values may be stored in each controller for each LED. The protocol allows a particular frame at a particular LED controller ID to be set to a unique color value.

A simple "step" command steps all of the LED controllers between these values to cause an animated display of the lights. Since the commands are passed from light to light in a "daisy chain" style, the following mechanism is used to allow the lights to change values synchronously.

Figure 10:
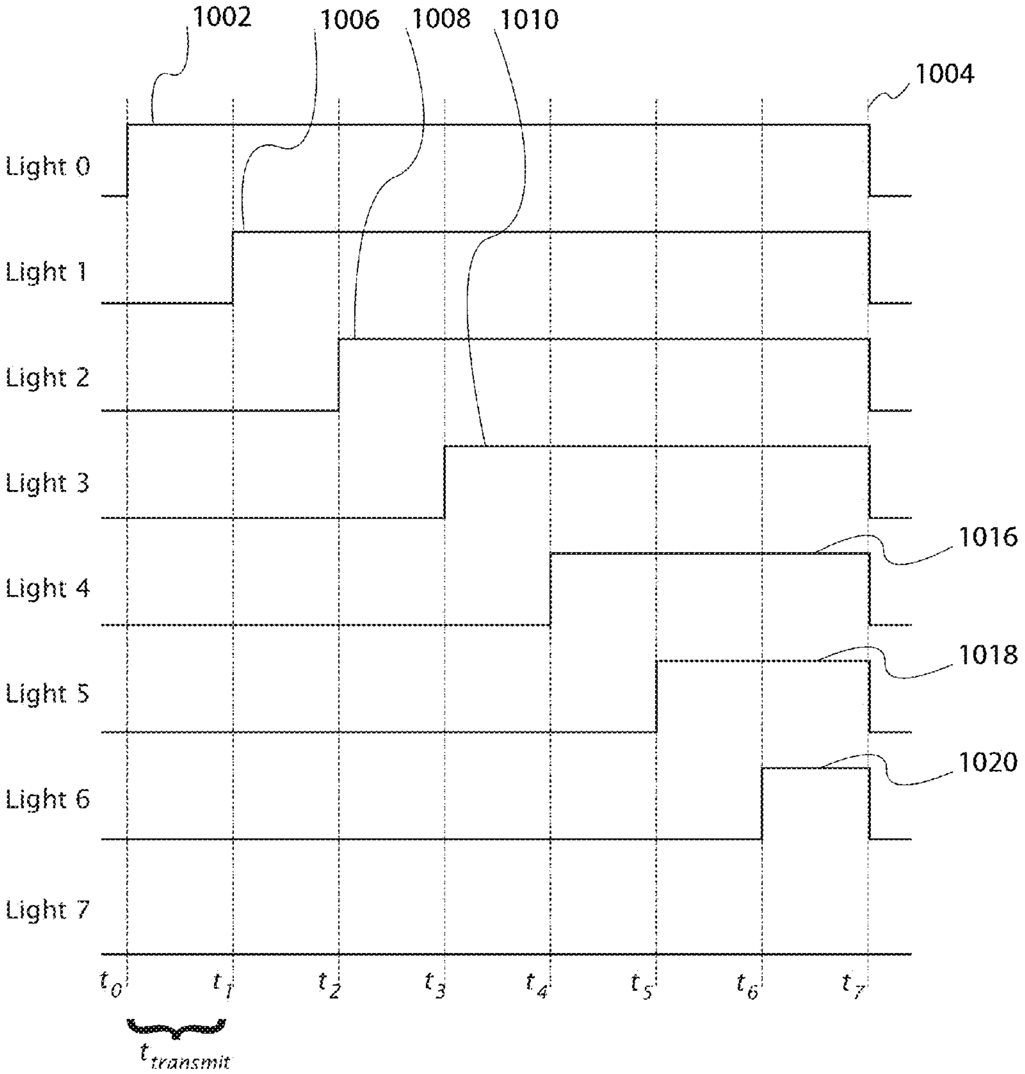
FIG. 10 shows the delays for synchronizing the animation in a string of seven lights.

First, the total number of lights in the chain is transmitted to all of the lights' microcontrollers. As shown in FIG. 10, when the step command is received, the first controller in chain sends the command on immediately, then delays for a time period 1002 of N×T, where N is the number of lights in the chain, and T is the time required to transmit the step command. When the next LED controller in the chain receives the step command, it delays for a time period 1006 (N−1)×T, and the controller after that delays for a time period 1008 (N−2)×T, etc. until the final LED in the chain has no delay at all. In this way, the LED controllers all step to the next color value at the same time. FIG. 10 shows this series of delays for a string of seven lights.

The program listing ControllerDemonstration.py shows an example of how to broadcast data to the lights. The program is written in the Python language, available from the Python Software Foundation for a wide variety of computer platforms. The program transmits commands with either a directly attached serial port, or a serial port attached via a network interface.

The interpretation of the protocol by the lights is done by the light's microcontroller when it receives serial data on its serial input line. When each byte of the message is ready, the microcontroller is interrupted from the PWM loop, and processes the data. If the data requires additional parameters, a state flag is set, instructing the microcontroller to interpret the next byte as a parameter when the next serial input interrupt occurs. For commands pertaining to a particular light ID in the string, the ID requested in the received command is compared to the ID set in the light when it was initialized. If the two match, the command (e.g., "set color") is processed. Otherwise, the microcontroller transmits the command to the next light down in the string.

In some embodiments of the invention, the ID and the total number of lights in the string may be written into the microcontroller's EEPROM memory and permanently stored, either during manufacture or during initial use, so the initialization of these parameters is no longer necessary.

Figure 4A:
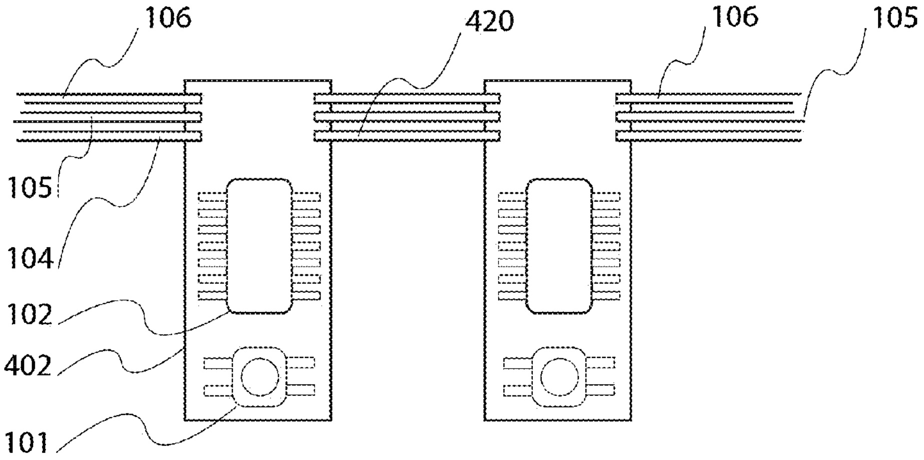
FIGS. 4A to 4C show specific physical implementations of the invention.

In the first embodiment of the invention, shown in FIG. 4A, the microcontroller 102 and RGB LED 101 for each light in the string are mounted on separate small printed-circuit boards 402 (PCBs) and connected together with wires for power 106, ground 105 and serial data 104, 420.

The C program LEDctlr.c is used to implement the light behavior. This program is compiled with BKND CC5X compiler, distributed by B Knudsen Data of Norway. The program may be adapted to other similar microcontrollers using similar C compilers.

The use of one microcontroller per LED is just one embodiment of an implementation of this invention. Larger microcontrollers can be used to control multiple LEDs, interpreting the protocol for each LED it controls in sequence. In such a system, when the microprocessor is initialized it assigns itself an ID for the first light it is connected to, then increments the ID number by the number of lights attached to it before sending the ID to the next light in the chain. When it receives commands pertaining to a particular light ID, it checks the ID against the range of lights connected to it before either processing it (and applying the change to the particular light connected to it) or passing it on to the next microcontroller in the chain.

Figure 4B:
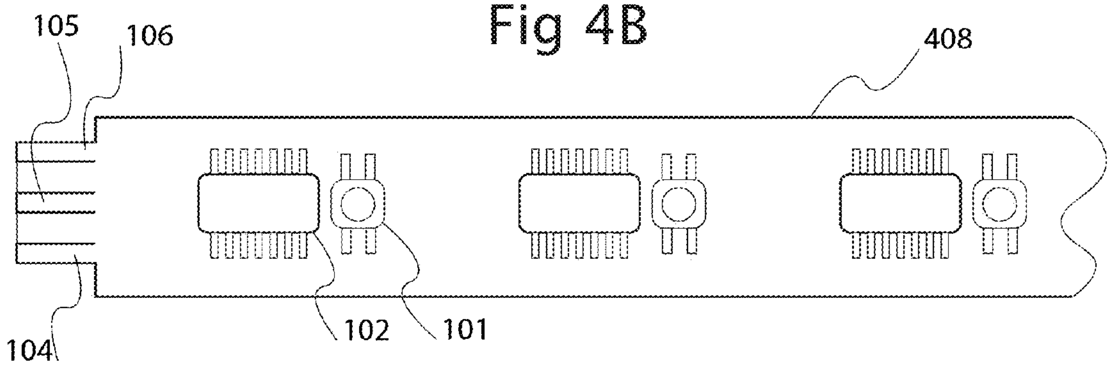
Figure 4C:
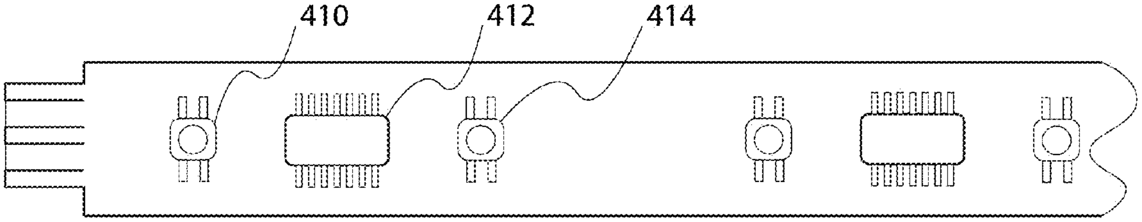

In other embodiments of the invention shown in FIGS. 4B and 4C, the components are mounted on a flexible printed circuit board and supplied as a continuous strip of lights. In this embodiment, a single microcontroller manages multiple lights, and accepts commands for those multiple light IDs when it interprets the protocol.

The invention claimed is:

1. A system comprising a plurality of lights, wherein:

a. each light is comprising of a microcontroller and at least one light emitting device attached to said microcontroller b. said light has a serial data input line connected to said microcontroller and a serial data output line connected to said microcontroller c. said serial data input line is attached to either a controlling device or computer, if it is the first light in the chain, or the previous light in the chain if it is not the first light in the chain d. said serial data output line is attached to the next light in the chain when it is not the last light in the chain e. a method by which an identifying number is assigned to and stored in the first light's microcontroller, and subsequent identifying numbers are automatically assigned to all subsequent lights in the chain and stored in their microcontrollers f. a method of sending control information such as color or brightness to a particular light in the chain of lights by passing said information from one light to the next light in the chain until the identifying number in the control information matches the identifying number stored in the light's microcontroller g. a method by which a plurality of different brightness or color values are stored in a particular light's microcontroller by means of sending serial data commands along the chain of lights that identifies a particular light by its stored identification number h. a means for the light's microcontroller to switch the color or brightness of the light from one stored value to another stored value i. a means for delaying the amount of time between receiving the command to switch from one stored brightness or color value to another stored brightness or color value is dependent on the position of the light in the string of lights, such that all lights except the last light delay switching colors or brightness until the last light in the chain of lights receives the command to switch color or brightness.

2. The system of claim 1 wherein the light emitting device consists of a light emitting diode, or a group of light emitting diodes emitting different primary colors for the purpose of generating different apparent colors.

3. The system of claim 1 wherein the brightness of the light emitting device or devices are controlled by means of using pulse width modulation.

4. The system of claim 1 further comprising a means to store a plurality of color or brightness values for each light in the microcontroller's electronically erasable read only memory, flash memory, or other non-volatile electronic storage whereby said color or brightness values are retained after power is removed from the lights.

5. The system of claim 3 further comprising a. a means to fade the color or brightness of the light so it fades smoothly from one value to another value over a period of time b. a system wherein the fade is accomplished by means of adjusting pulse-width modulation duty cycles by adding or subtracting sequential increments of the duty cycle from a lookup table over the course of the fade operation c. said lookup table defines time intervals for applying said sequential increments to control the length of the fade operation d. said lookup table is stored in a compact form, whereby a minimal amount of memory is used.

6. The system of claim 5 wherein a single microcontroller controls a plurality of lights, and said microcontroller responds to multiple identifying numbers corresponding to said lights, and stores color and brightness values for a plurality of lights.

* * * * *